United States Patent
Britney et al.

(10) Patent No.: US 7,523,068 B2
(45) Date of Patent: Apr. 21, 2009

(54) CENTRALIZED PAYMENT PROCESSING SYSTEM

(75) Inventors: Samantha A. Britney, Seattle, WA (US); Kimberly J. Kroetsch, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 519 days.

(21) Appl. No.: 11/129,082

(22) Filed: May 13, 2005

(65) Prior Publication Data

US 2006/0259423 A1    Nov. 16, 2006

(51) Int. Cl.
*G06Q 40/00* (2006.01)
(52) U.S. Cl. .............................. 705/40; 705/35; 705/39
(58) Field of Classification Search .................. 705/39, 705/40
See application file for complete search history.

(56) References Cited

U.S. PATENT DOCUMENTS

| | | | |
|---|---|---|---|
| 5,920,847 A * | 7/1999 | Kolling et al. ................. 705/40 |
| 6,070,150 A * | 5/2000 | Remington et al. ........... 705/34 |
| 2002/0087469 A1 * | 7/2002 | Ganesan et al. ............... 705/40 |
| 2002/0111916 A1 * | 8/2002 | Coronna et al. ............... 705/64 |
| 2004/0078327 A1 * | 4/2004 | Frazier et al. ................. 705/40 |
| 2004/0215560 A1 * | 10/2004 | Amalraj et al. ............... 705/40 |
| 2005/0065882 A1 | 3/2005 | Remington et al. |

OTHER PUBLICATIONS

Derivion Takes Internet Billing to New Level, Unveils Next-Generation EBPP Services PR Newswire. New York: Oct. 11, 1999. p. 1.*

International Search Report and Written Opinion of Application Serial No. PCT/US06/12552 filed Apr. 5, 2006; mailed Sep. 4, 2007.

* cited by examiner

*Primary Examiner*—Daniel S. Felten
*Assistant Examiner*—William E Rankins
(74) *Attorney, Agent, or Firm*—Westman, Champlin & Kelly, P.A.

(57) ABSTRACT

A centralized payment processing system is disclosed, which gives the user the ability to create payment outputs in a centralized environment. The centralized payment processing system includes embodiments in the form of a computer-readable medium, a method, and a means for processing payments, for example. The computer-readable medium includes computer-executable instructions to be executed by a computer. When these instructions are executed, they configure the computer to run a centralized payment processing system which is configured to receive a batch of obligated payments from a database, user interface, or other data source. The system is further configured to group some of the obligated payments into first, second, and potentially additional sets of obligated payments to be paid using first, second, and potentially additional payment methods. The system is further configured to enter the first, second, and potentially additional sets of obligated payments to first, second, and potentially additional payment method processing modules. The system is further configured to execute the first, second, and potentially additional payment method processing modules, thereby generating a first, second, and potentially additional sets of prepared payments. The system is further configured to receive the first, second, and potentially additional sets of prepared payments from the first, second, and potentially additional payment method processing modules.

18 Claims, 3 Drawing Sheets

CENTRALIZED PAYMENT PROCESSING SYSTEM

BACKGROUND OF THE INVENTION

The present invention relates to business solutions, and in particular to a centralized system for processing payments.

Businesses have traditionally sought to use technological solutions to address operational requirements such as financial management, supply chain management, customer relationship management, and business analysis, which can be collectively referred to as enterprise resource planning (ERP) systems. In typical enterprise resource planning (ERP) systems, a user has to process payments of different payment methods in separate runs or batches or with different systems. A user often must also use different runs or batches or different systems for different payment source accounts, different currencies, or different payees. Such systems are not very efficient to operate or to support accounting and business management.

SUMMARY OF THE INVENTION

The centralized payment processing system of the present invention, in a variety of potential embodiments, gives the user the ability to create payment outputs in a centralized environment. The centralized payment processing system may provide a single, centralized solution for processing all ERP payments, combining the ability to process payments with different payment methods, different source accounts, different currencies, and different payees, for example, in various embodiments.

One embodiment pertains to a computer-readable medium comprising computer-executable instructions. When these instructions are executed by a computer, they configure the computer to run a centralized payment processing system. The centralized payment processing system is configured to receive a batch of obligated payments from a data source. It is further configured to group some of the obligated payments into a first set of obligated payments to be paid using a first payment method, and some of the obligated payments into a second set of obligated payments to be paid using a second payment method. It is further configured to enter the first set of obligated payments to a first payment method processing module, and the second set of obligated payments to a second payment method processing module. It is further configured to execute the first and second payment method processing modules, thereby generating a first set of prepared payments, corresponding to the set of obligated payments, and a second set of prepared payments, corresponding to the second set of obligated payments. It is further configured to receive the first and second sets of prepared payments from the first and second payment method processing modules.

Another embodiment pertains to a method of processing payments. The method includes receiving a batch of obligated payments and grouping a first set of the obligated payments to be paid according to a first payment method, and a second set of the obligated payments to be paid according to a second payment method. The method also includes executing a first payment method processing module, configured to process payments using the first payment method, on the first set of obligated payments. This generates a first set of prepared payments corresponding to the first set of obligated payments The method similarly includes executing a second payment method processing module, configured to process payments using the second payment method, on the second set of obligated payments. This generates a second set of prepared payments corresponding to the second set of obligated payments.

Another embodiment pertains to a system of modules configured for processing payments, comprising modules that, when executed, are configured to receive a batch of obligated payments from a data source. Each of the obligated payments is to be paid using a selected payment method from among a plurality of payment methods. The modules are also configured to group each of the obligated payments to be paid using a first payment method from among a plurality of payment methods into a first payment set, and each of the obligated payments to be paid using a second payment method from among a plurality of payment methods into a second payment set. The modules are also configured to transfer the first payment set to a first payment method processing module, and the second payment set to a second payment method processing module. The modules are also configured to execute the first and second payment method processing modules, thereby generating a first set of prepared payments, corresponding to the first payment set, and a second set of prepared payments, corresponding to the second payment set.

Additional features and advantages of different embodiments will be understood by those of skill in the art from the illustrative embodiments as described and depicted in the description and figures herein.

DETAILED DESCRIPTION OF ILLUSTRATIVE EMBODIMENTS

The centralized payment processing system, in an illustrative embodiment, is a centralized processing system that prepares obligated payments for output to potentially several available payment method processing modules. Obligated payments are sent to this centralized process once they are ready to be processed. The centralized payment processing system of the present invention, in a variety of potential embodiments, gives the user the ability to create payment outputs using a variety of payment methods and payment method processing modules, under the control of a single, centralized payment processing system and interface. In other words, the centralized payment processing system can process all currently obligated, required or pending payments together, regardless of the method of payment, the source bank account for the payment, the currency of the payment, or the type or identity of the payees, such as suppliers, customers, and employees, according to various illustrative embodiments. The payment processing system can group payments to be paid according to the same method of payment, sending payments to the appropriate one of potentially several available payment method processing modules. Each payment method processing module is configured to process payments using a particular payment method, such as for checks, electronic fund transfer (EFT), and other payment methods. The payment processing system can then receive the prepared payments back from the payment method processing modules after they are done generating prepared payments to correspond to the obligated payments. Obligated payments are payments that need to be made but have not yet been prepared, let alone posted or issued. They are thus to be distinguished from prepared payments, which are generated by the respective payment method processing modules, and are ready to post once the payment processing system is through with them.

Figure 1:
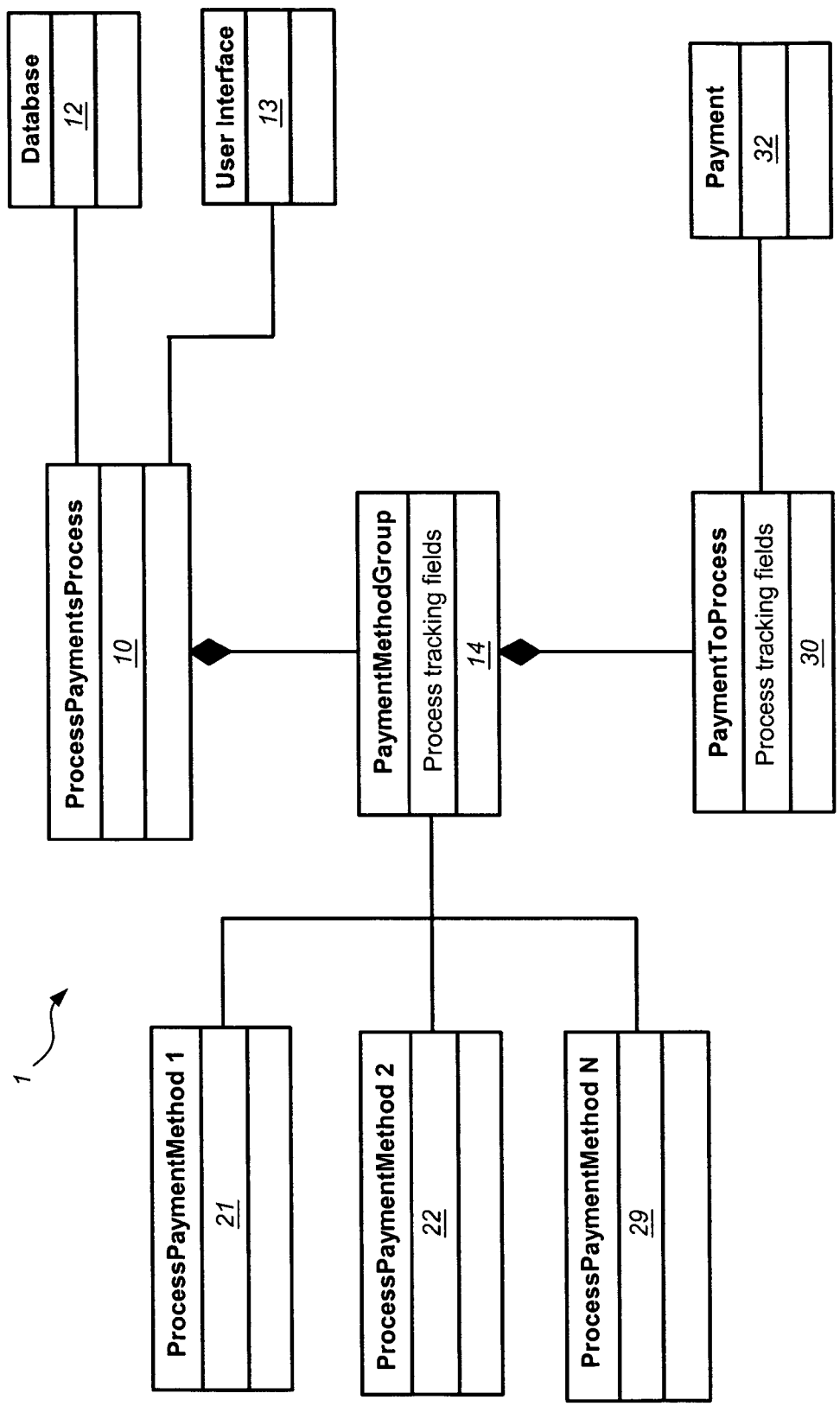
FIG. 1 depicts a program object diagram of a configuration of a system according to one illustrative embodiment.

FIG. 1 depicts a program object diagram representing a centralized payment processing system 1 and other elements of its computing environment, according to one embodiment. A computer-readable medium may include computer-executable instructions that configure a computer to run the centralized payment processing system 1 as depicted in FIG. 1. The centralized payment processing system 1 includes a system of modules structured around the processes that it is configured to perform, so the depiction of FIG. 1 also discloses aspects of a process, according to an illustrative embodiment. The system of modules of centralized payment processing system 1 is configured to process payments by accomplishing certain payment processing tasks, including by various program modules it includes or is able to generate, in various embodiments. For example, as depicted in FIG. 1, centralized payment processing system 1 includes a master program module 10 called ProcessPaymentsProcess, for receiving obligated payments and organizing the processing of such payments; and a program module 14 called PaymentMethodGroup, for grouping obligated payments into smaller sets to be paid using different payment methods. In one embodiment, these two modules, as a system of modules configured to process payments, constitute the entirety of centralized payment processing system 1, while the other depicted modules are elements of the computing environment that are communicatively accessible to centralized payment processing system 1, and which system 1 is configured to make use of. In other embodiments, centralized payment processing system 1 may include other modules depicted in FIG. 1, such as the program modules 21, 22 and 29, called ProcessPaymentMethod 1, 2, and N, respectively, for generating prepared payments to correspond to the obligated payments distributed to them; the program module 30, called PaymentToProcess, for receiving the prepared payments; and program module 32, called Payment, which incorporates the prepared payments. In this way, whether the remaining components are considered exterior elements of the computing environment of centralized payment processing system 1 or components thereof, centralized payment processing system 1 is configured to perform various payment processing tasks, according to one illustrative embodiment. These configurations of centralized payment processing system 1 are described in greater detail below.

There are several benefits of centralizing this payment processing with centralized payment processing system 1. For example, an embodiment of centralized payment processing system 1 provides a single location for pre-processing handling of payments, regardless of output. Another advantage of an embodiment of centralized payment processing system 1 is that payments with various output methods can be submitted together by the user and received together by the system 1, so that a user is not required to do separate payment runs based on a single payment method. Centralized payment processing system 1 also provides for payments to be sent to the appropriate output, and returned to payment process after output is complete, in one illustrative embodiment.

The centralized payment processing system 1 includes master program module 10, ProcessPaymentsProcess, which is communicatively connected to database 12 and user interface 13, thereby configuring centralized payment processing system 1 to receive a batch of obligated payments from database 12 or user interface 13, in this illustrative embodiment. Database 12 and user interface 13 are considered exterior to centralized payment processing system 1 in this embodiment, and are representative of what could be any number of databases, user interfaces, or data sources of any kind to which the ProcessPaymentsProcess module 10 of centralized payment processing system 1 is communicatively connected. Database 12, user input via user interface 13, and other potential data sources provide data on obligated payments to be made, in a form such that processing system 1 can receive and perform processing tasks on the obligated payment data, in an illustrative embodiment. The obligated payments may include payroll payments, payments to suppliers in exchange for goods supplied, payments to service providers in exchange for services performed, refund payments to customers, and loan payments to banks and other creditors, for example. It may be the case in some applications that some or all of these types of obligated payments are received from different databases, user interfaces, or other data sources, connected with the systems dealing with the types of functions associated with those types of payments. For example, obligated payroll payments may be received from a database connected to a payroll management system, while obligated payments to suppliers for goods received may be received from a database connected to a procurement and logistics management system, in one illustrative application.

The ProcessPaymentsProcess module 10 has a parent-child relationship with the depicted representative PaymentMethodGroup program module 14, another part of the centralized payment processing system 1. After the centralized payment processing system 1 has received a batch of obligated payments from a data source such as the database 12 or user interface 13, it enters or transfers the obligated payments to the PaymentMethodGroup module 14. Module 14 groups some of the obligated payments into a first set of obligated payments to be paid using a first payment method, and some of the obligated payments into a second set of obligated payments to be paid using a second payment method. The payment methods to be used might be, for example, payment by check, by electronic fund transfer (EFT), by cash, by credit, by debit, and so forth. For example, the first payment method might be payment by check, while the second payment method might be payment by EFT, in one illustrative embodiment. Module 14 may group the obligated payments according to an indication carried by the payments of what method is to be used for the respective payment, in one illustrative embodiment. As another example, module 14 may include or have access to preselected criteria for determining what payment method is to be used for certain obligated payments. For example, module 14 may have access to a human resources database, and when it receives a batch of obligated payroll payments, module 14 compares the names or identification numbers on the obligated payroll payments against an index on the human resources database that indicates which employees are to receive payment by check, and which employees are to receive payment by direct deposit. Module 14 of centralized payment processing system 1 is configured to then enter or transfer the set of payroll payments to be made by check to a check processing module, and to enter or transfer the set of payroll payments to be made by direct deposit to a direct deposit processing system.

Module 14 of centralized payment processing system 1 may further group some of the obligated payments into third, fourth, fifth or more sets of obligated payments, to be paid using third, fourth, fifth or more payment methods, respectively, in one illustrative embodiment. For example, if the first and second payment methods are check and EFT, respectively, the third, fourth, fifth payment methods might be cash, credit, and debit, respectively, in one illustrative embodiment. As mentioned, still more payment methods may also be included. To generalize this potential, the number of particular payment methods accessible to a particular embodiment may be referred to as N, and the last of these payment methods in order may be referred to as the Nth payment method. So, centralized payment processing system 1 may be configured to group some of the obligated payments into third through Nth sets of obligated payments to be paid using third through Nth payment methods, respectively, in one illustrative embodiment. As another example, if N is three, as is literally depicted in FIG. 1, the third through Nth payment method processing modules would be a set of one payment method processing module; that is, "third through Nth" would then refer simply to the third, in such an embodiment.

Similarly, the payment method processing modules are depicted as program modules 21, 22 and 29 in FIG. 1. These payment method processing modules are illustratively named ProcessPaymentMethod 1, ProcessPaymentMethod 2, and ProcessPaymentMethod N. As further indicated by the N as the index of the third of the three depicted payment method processing modules, any number of payment method processing modules may be used by centralized payment processing system 1, up to N payment method processing modules, in the embodiment depicted in FIG. 1. While the payment method processing modules 21, 22 and 29 are depicted in FIG. 1 as program modules, each of these modules may also have access to additional resources needed to generate a prepared payment corresponding to each obligated payment file it receives, according to the specific payment method used by the individual payment method processing module. For example, if payment method processing module 21 is a check processing module, it may have communicative access to a computer associated with a checking account at a bank, in order to retrieve and return check numbers in the process of printing checks, in one illustrative embodiment. An embodiment of this type is described in more detail in the patent application entitled Check Printing System by the same inventors of the present patent application, and filed on the same day as the present application, and the contents of which are incorporated by reference herein.

Once module 14 has grouped the obligated payments into first, second, and potentially third through Nth sets of obligated payments according to the payment method to be used, module 14 of centralized payment processing system 1 enters the sets of obligated payments to the appropriate payment method processing modules. For example, module 14 enters the first set of obligated payments to first payment method processing module 21, and the second set of obligated payments to second payment method processing module 22. Module 14 may also enter third through Nth sets of obligated payments to third through Nth payment method processing modules, respectively, in one illustrative embodiment. In another illustrative embodiment, only a single payment method processing module may be accessible to module 14 of centralized payment processing system 1. However, centralized payment processing system 1 is still configured to be able to use more than one payment method processing module in such a case, in an illustrative embodiment.

After the sets of obligated payments have been entered to their respective payment method processing modules based on payment method, centralized payment processing system 1 executes the payment method processing modules, such as representative modules 21, 22 and 29. Executing the first payment method processing module 21 which prepares a first set of payments, or generates a first set of prepared payments, corresponding to the set of obligated payments entered to the first payment method processing module 21, for example. Similarly, executing the second payment method processing module 22 prepares or generates a second set of prepared payments, corresponding to the set of obligated payments entered to the second payment method processing module 21. The Nth payment method processing module 29, if executed, may also generate an Nth set of prepared payments, corresponding to the set of obligated payments entered to the Nth payment method processing module 21, in an illustrative embodiment.

When one of the payment method processing modules is executed, it may carry out a particular set of tasks for generating a prepared payment corresponding to each obligated payment it receives, according to the particular requirements of its particular payment method. For example, payment method processing module 21 may be a check processing module, configured to process payments using checks as the payment method. In this case, executing system 21 will generate a set of printed checks, prepared and ready to be posted, corresponding to the obligated payments that were entered to check processing module 21. For example, executing system 21 may prepare a respective check for a respective obligated payment by entering a check number in a check number data field, enter a date from a locally accessible date/time properties module, and enter a payee name and an amount of payment from information provided in the respective obligated payment data. Executing system 21 thereby generates a prepared check payment corresponding to this respective obligated payment. Analogous particular tasks may be used by the other payment method processing modules for generating prepared payments according to their payment methods.

The module 14 of centralized payment processing system 1 is configured to receive the sets of prepared payments from each of the payment method processing modules, as they finish generating the prepared payments. This may include, for example, first and second sets of prepared payments from the first and second payment method processing modules 21 and 22. It may also include up to an Nth set of prepared payments from up to the Nth payment method processing module 29. The centralized payment processing system 1 may then conclude by cleaning up the prepared payment output from the payment method processing modules, such as by checking to see if there is a prepared payment to correspond to each received obligated payment, and to dispose appropriately of any anomalous output, such as sending a user alert if either an obligated payment or a prepared payment is detected that does not correspond appropriately. The prepared payments are then ready for posting or issuing. In one embodiment, the centralized payment processing system 1 has then completed its task as to that particular batch of obligated payments. There may be no final cleanup step in such an embodiment. In an alternate embodiment, the centralized payment processing system 1 may be configured to actively submit the sets of prepared payments to be posted. This may take the form of printed checks being posted, or an EFT being transmitted, or a credit transaction being transmitted, for example.

In one embodiment, user input is limited throughout this process carried out by centralized payment processing system 1. In this embodiment, module 10 of centralized payment processing system 1 pulls all regularized payment info from database 12 at the start of processing a batch of obligated payments. This assumes that the needed current payment data are present in database 12 before payment processing begins.

Some data may be pre-entered by a user via user interface 13 or pulled from other network resources, such as other databases, etc. The payment processing may take place according to a scheduled command. In this case, centralized payment processing system 1 may carry out the entire payment processing automatically, in one embodiment. In other embodiments, a user may take action merely to initiate the payment process, or to review the prepared payments from the final output from centralized payment processing system 1, for example. In still another embodiment, centralized payment processing system 1 may be configured to solicit processing approval or validation for one or more of the obligated payments. This might take place before the centralized payment processing system 1 groups the obligated payments into their respective sets of obligated payments according to payment method, for example, in this illustrative embodiment.

Centralized payment processing system 1 may also be configured to group the obligated payments according to other categories than only payment method, in some embodiments. Other categories into which the centralized payment processing system 1 may be configured to group the obligated payments include the source account, from which funds are to be drawn; the currency in which the payment is to be denominated; and the payee to whom the payment is to be made, in various embodiments. In one illustrative embodiment, the centralized payment processing system 1 is configured to first group the obligated payments into separate sets based on payment method; then to separate one or more of the sets of obligated payments into subsets of obligated payments to be paid out of one or more respective source accounts; then to separate one or more of the sets of obligated payments into subsets of obligated payments to be paid with one or more respective currencies; and finally, to separate one or more of the sets of obligated payments into subsets of obligated payments to be paid to one or more respective payees.

In a variation on this embodiment, the centralized payment processing system 1 is configured to identify and combine two or more of the obligated payments being assigned to the same payment method set, the same source account subset, the same currency subset, and the same payee subset. The system 1 may identify and combine same-category payments even over, for example, several days, in an embodiment in which the centralized payment processing system 1 operates on one or more batches of obligated payments over several days' time before the prepared payments output is retrieved and posted.

Embodiments such as these therefore provides a single, centralized environment and process for distinguishing and processing payments in any or all four of the categories listed above. This may be combined with another embodiment, in which the centralized payment processing system 1 is configured to reportably track the executing of the payment method processing modules 21, 22, 29. This embodiment, including the configuration for reportably tracking the payment processing, may also occur without the embodiment in which the additional categories of source account, currency, and payee are distinguished and separated. The reportable tracking feature tracks data on the progress of the obligated payments throughout the payment processing, as well as the prepared payments once they are generated, according to one illustrative embodiment. The data thus tracked may be reported, such as by display on a monitor visible to a user, or stored in a database for a user to look up with an appropriate command, in various embodiments. The centralized payment processing system 1 may also be configured to track the execution of the various payment method processing modules, even including intrusive monitoring on external resources involved respectively in each of the particular payment method processing modules, according to one illustrative embodiment. This supports the role of the centralized payment processing system 1 as a truly centralized tool with which the user can operate and track the entire process of payment processing, in this illustrative embodiment.

Figure 2:
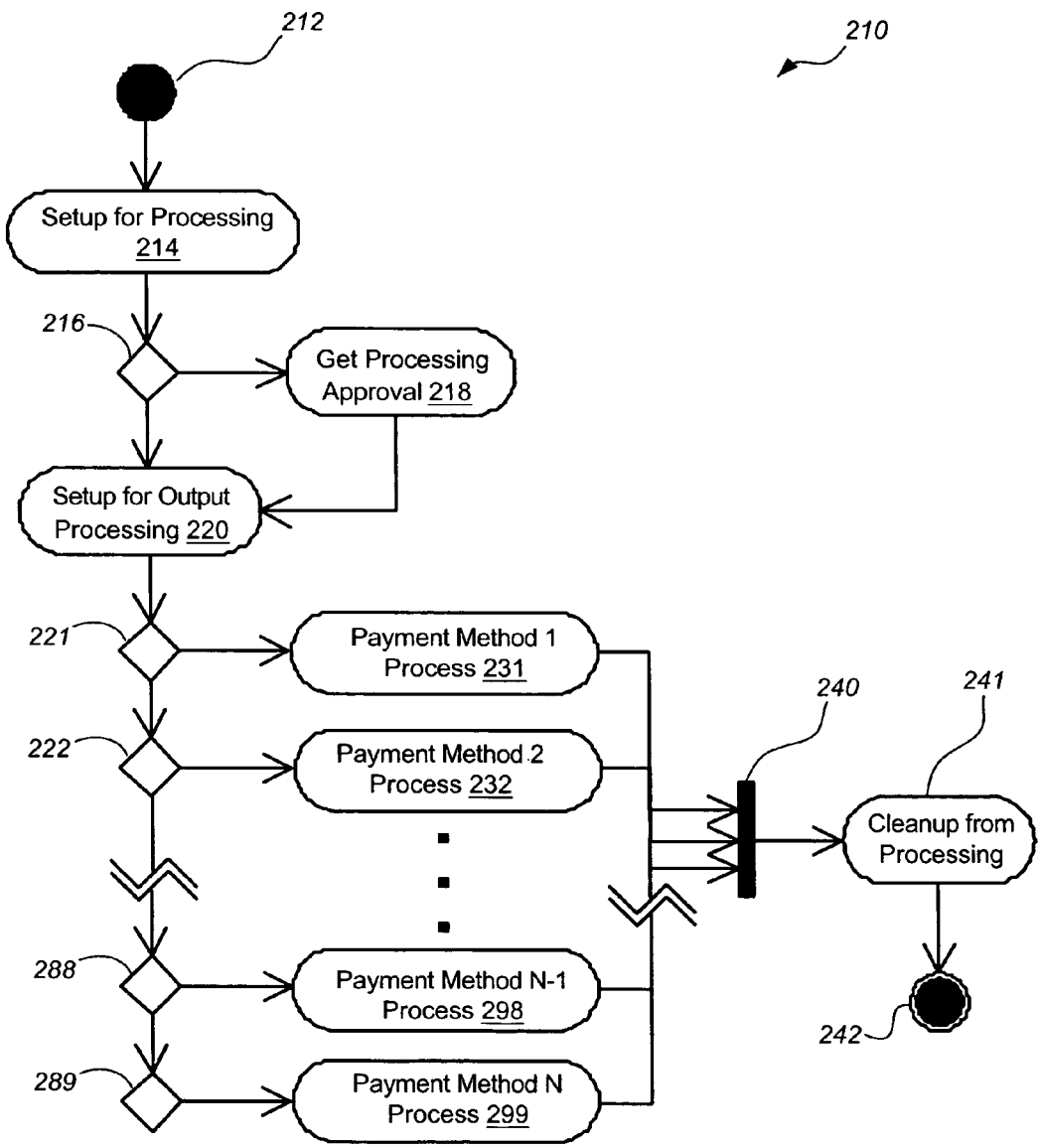
FIG. 2 depicts a flowchart representing a method according to another illustrative embodiment.

FIG. 2 depicts a flowchart representing a centralized payment processing method 210 according to another illustrative embodiment of the present invention. The centralized payment processing method 210 shares certain features in common with the processes and actions attributed to centralized payment processing system 1 in the description above.

Process 210 proceeds from the operation 212 of opening a new payment processing session, to an action 214 labeled Setup for Processing. Action 214 may include, for example, receiving input, such as from a communicatively accessible database, or in the form of user input via a user interface, that includes a batch of obligated payments. In the embodiment of FIG. 2, the method then proceeds from action 214 to decision point 216, which is whether processing approval is required for any or all of the obligated payments received. If yes, the method leads to the Get Processing Approval action 218, and from there to the Setup for Output Processing action 220; if no, the method leads directly to the Setup for Output Processing action 220. If the method is directed to Get Processing Approval action 218, it stops and waits until it has received a user response for all payments requiring approval, in this embodiment. Approved payments and payments not requiring approval proceed to Setup for Output Processing action 220 as shown, to be prepared for output processing. Any rejected payments are not prepared for output processing, but may still be tracked to provide reporting at the completion of the process 210, in this embodiment.

In another embodiment, approval is relegated to a function prior to initiation of the method 210 or is assumed, and no approval is sought within method 210. In that sort of embodiment, decision point 216 and action 218 would not occur, and the Setup for Processing action 214 would lead directly to the Setup for Output Processing action 220.

Setup for Output Processing action 220 includes grouping some of the obligated payments into a first set of obligated payments to be paid using a first payment method, and some of the obligated payments into a second set of obligated payments to be paid using a second payment method. It may also include grouping additional payments into additional respective sets to be paid using additional respective payment methods. Once the obligated payments are thus grouped, they are entered to the appropriate payment method processing module. In particular, Setup for Output Processing action 220 leads to decision point 221, which is whether a given set of obligated payments is to be paid using the first payment method. If yes, the set is sent to Payment Method 1 Process 231, the payment method processing module for the first payment method, whether that method be checks, EFT, etc. If no, that set is sent on to the next decision point 222, which asks whether the set is to be paid using the second payment method. If yes, this set passes to Payment Method 2 Process 231, the payment method processing module for the second payment method, again whether that method is checks, EFT, or another method.

One illustrative method uses only the first and second payment methods and corresponding processing systems 231 and 232, and would not include any further payment method processing modules, e.g. 298, 299. Another illustrative embodiment, following the depiction of FIG. 2, does include further payment method processing modules up to 298, 299. The breaks, including along the "no" line from decision point 222, indicate that the subject matter past the breaks can include any of a number of different payment method processing modules and corresponding decision points. That number may be zero, as in the embodiment mentioned above, or it may be two, as explicitly depicted in FIG. 2, or it may be one or three or something more.

Following the explicit depiction of FIG. 2, the "no" line from decision point 222 leads, perhaps after other elements, to decision point 288, which asks whether the set of obligated payments is to be paid using the N−1 payment method. If yes, the set passes to Payment Method N−1 Process 298. If no, the set passes to the final decision point 289, which asks whether the set is to be paid using the Nth payment method. If yes, the set passes to Payment Method N Process 299. Although it is not pictured, if the answer to decision point 289 is "no", and the set has passed through the entire string of payment method decision points without triggering a "yes" the set may be sent along a "no" line to a follow-up batch to determine the source of the anomalous behavior.

The various payment method processing modules 231, 232, 298, 299 may include, for example, a check payment processing module configured to process payments by check; an EFT payment processing module configured to process payments by EFT; a cash payment processing module configured to process payments by cash, and so forth, in this illustrative embodiment. Whatever the particular payment method, the method executes each payment method processing module when a set is entered to it by giving a "yes" answer to the appropriate decision point, and the payment method processing module generates a set of prepared payments corresponding to that set of obligated payments. The method 210 then includes receiving, at threshold 240, the sets of prepared payments from the payment method processing modules 231, 232, 298, 299. Threshold 240 may wait to receive all sets of prepared payments corresponding to all sets of obligated payments from a given batch, before providing the finished output of prepared payments, in one illustrative embodiment. The output of prepared payments passes through Cleanup from Processing action 241, in this illustrative embodiment. Action 241 may, for example, compile tracking data accompanying the prepared payments output, and may transmit an alert in response to anomalous output such as the number of prepared payments in the output not matching the number of obligated payments in the input, for example. Action 241 leads to endpoint 242, where all prepared payment output, potentially along with tracked data pertaining to the performance of process 210, is available for review or posting, for example.

In one illustrative embodiment, a method conforming to the depicted process 210 may also include additional category grouping of the obligated payments. This additional category grouping may take place as part of Setup for Output Processing action 220, for example. In this embodiment, action 220 may, after grouping the obligated payments according to payment method, go on to further group or separate the obligated payments into source account subsets to be paid out of respective source accounts. Action 220 may further group according to the currency in which the payment is to be denominated: for example, U.S. dollars, euros, Japanese yen, Swiss francs, etc. While currency denomination may often be uniquely determined by source account, this is not always the case. Action 220 may further group the source account subsets into currency subsets to be paid with the respective currencies, or it may not include an account grouping, and only further group the payment method groups by currency, for example. Action 220 may also include grouping the obligated payments into payee subsets to be paid to respective payees. Once again, the grouping into payee subsets may be done sequentially, so that it is applied to the currency subsets, within the source account subsets, within the payment method subsets; or the grouping into payee subsets may be done only on top of the payment method subsets, or some other combination of subsets, in various embodiments. Other means for processing payments according to the description herein occur in other embodiments.

Figure 3:
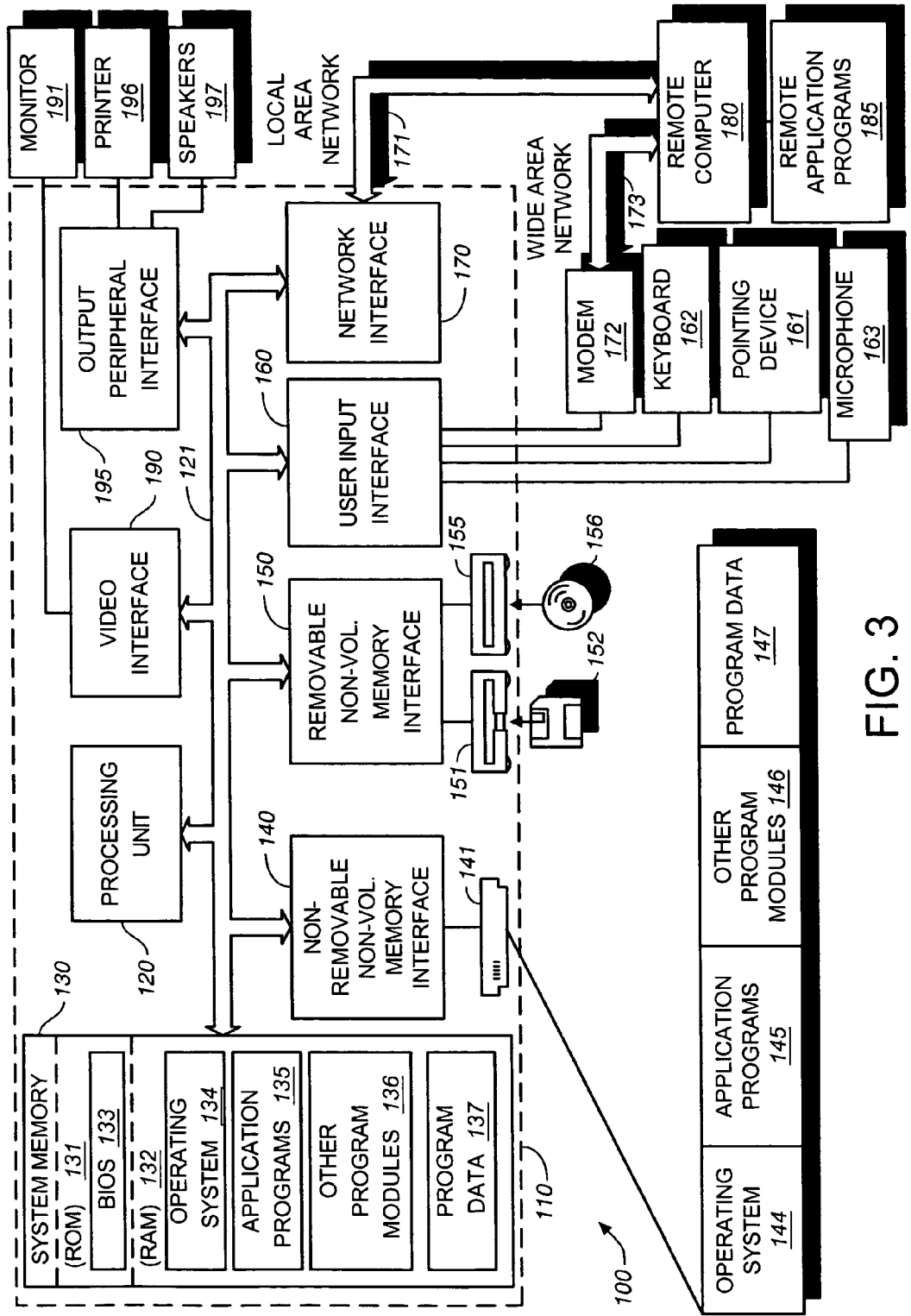
FIG. 3 depicts a block diagram of a computer suitable for a computer-readable medium of the present invention to be loaded onto and configured in accordance with, and for executing the instructions included in the computer-readable medium, according to one illustrative embodiment.

FIG. 3 depicts a fairly generalized environment in which the present invention may be incorporated in accordance with some illustrative embodiments. FIGS. 1 and 2, described above, more particularly depict some of the specific aspects of some illustrative embodiments. As an illustrative example, FIG. 3 depicts a block diagram of a computing system environment 100 including computer 110 suitable for a computer-readable medium of the present invention to be loaded onto and configured in accordance with, and for executing the instructions included in the computer-readable medium, according to one illustrative embodiment. The computing system environment 100 is one of many possible examples of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Various embodiments of the invention are operational with numerous other general purpose or special purpose computing system environments or configurations. Examples of well known computing systems, environments, and/or configurations that may be suitable for use with the invention include, but are not limited to: personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as executable program modules and files generated in the context of executable program modules, being executed by a computer. Generally, program modules may include routines, programs, objects, components, data structures, files, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 110 typically includes a variety of computer-readable media, and means for accessing such computer-readable media and executing instructions included thereon. Computer-readable media can be any available media that can be accessed by computer 110 and can include both volatile and nonvolatile media, both removable and non-removable media, and both local and remote media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile discs (DVD) or other optical disc storage, magnetic cassettes, magnetic tape, magnetic disc storage or other magnetic storage devices, or any other medium which can be used to store the desired information and which can be accessed by computer 100, whether by local bus, local network, or a remote network connection such as over the Internet. Communication media typically embody computer-readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable volatile/nonvolatile computer storage media. By way of example only, FIG. 3 illustrates a hard disc drive 141 that reads from or writes to non-removable, nonvolatile magnetic media, a magnetic disc drive 151 that reads from or writes to a removable, nonvolatile magnetic disc 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disc drive 141 is typically connected to the system bus 121 through a non-removable memory interface such as interface 140, and magnetic disc drive 151 and optical disc drive 155 are typically connected to the system bus 121 by a removable memory interface, such as interface 150.

The drives and their associated computer storage media discussed above and illustrated in FIG. 3, provide storage of computer-readable instructions, data structures, program modules and other data for the computer 110. In FIG. 3, for example, hard disc drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 3. However, the present invention can be carried out on a server, a computer devoted to message handling, or on a distributed system in which different portions of the present invention are carried out on different parts of the distributed computing system.

In the present description, embodiments are described with reference to acts and symbolic representations of operations that are performed by one or more computers configured to execute such operations, unless indicated otherwise. As such, it is understood that such operations, which are at times referred to as being executed by the computer, include the manipulation by a processing unit, included in the computer, of electrical signals representing structured data. Such manipulation may transform the data or maintain it at locations in memory systems of the computer, which reconfigures or otherwise alters the operation of the computer in a manner well understood by those skilled in the relevant arts. The data structures where data is maintained are physical locations of the memory that have particular properties defined by the format of the data. Other forms of implementation encompassed within the present invention may be included in other embodiments.

As is apparent to those with skill in the relevant arts, the program object diagram of FIG. 1 and the flowchart of FIG. 2 are applicable to any of a wide variety of hardware systems, operating systems, and other implementation methods. The systems of the embodiments depicted in FIGS. 1 and 2 may be implemented in a modular or object oriented software environment, such as, for example, the component object model (COM) developed by the assignee of the present application.

Although the present invention has been described with reference to preferred embodiments, workers skilled in the art will recognize that changes may be made in form and detail without departing from the spirit and scope of the invention.

What is claimed is:

1. A computer-readable medium comprising computer-executable instructions which, when executed by a computer, configure the computer to:
    run a payment processing application that interactively provides user output and receives user input through a single, centralized user interface, enabling the payment processing application to be controlled and tracked through the user interface;
    provide a first user option to open a payment processing session, and open a payment processing session in response to a user selecting the first user option;
    provide user-selectable options through the user interface enabling a user to designate a batch of obligated payments from a plurality of sources representing a plurality of different types of obligated payments;
    provide user-selectable options through the user interface for the batch of obligated payments to include specified types of obligated payments, wherein the user-selectable options for the specified types of obligated payments comprise: payroll payments, payments to suppliers in exchange for goods supplied, payments to service providers in exchange for services performed, refund payments to customers, and loan payments to banks and other creditors;
    provide user-selectable options through the user interface enabling a user to group sets of the obligated payments to be paid with specified user-selectable payment options, wherein the user-selectable payment options for the sets of the obligated payments comprise: payment methods, source accounts from which the payments are to be made, currencies in which the payments are to be made, and payees to whom the payments are to be made, and wherein the options for payment methods include checks and electronic fund transfer;
    enter each of the sets of obligated payments to a respective payment method processing module that corresponds to the user-selectable types of obligated payments and payment options selected for the respective set of obligated payments; and
    execute the payment method processing modules, thereby generating a plurality of sets of prepared payments using the respective payment options selected for each of the sets of obligated payments.

2. The computer-readable medium of claim 1, wherein the computer-executable instructions further configure the computer to:
    group third through Nth sets of the obligated payments to be paid using third through Nth payment methods, respectively;
    enter the third through Nth sets of obligated payments to third through Nth payment method processing modules, respectively; and
    execute the third through Nth payment method processing modules, thereby generating third through Nth sets of prepared payments third through Nth payment methods, corresponding to the third through Nth sets of obligated payments.

3. The computer-readable medium of claim 1, wherein the computer-executable instructions further configure the computer to submit the first and second sets of prepared payments to be posted.

4. The computer-readable medium of claim 1, wherein one of the payment method processing modules is a check payment processing module configured to process payments by check, and wherein the computer-executable instructions further configure the computer to enter a respective one of the sets of obligated payments to the check payment processing module.

5. The computer-readable medium of claim 1, wherein one of the payment method processing modules is an electronic fund transfer payment processing module configured to process payments by electronic fund transfer, and wherein the computer-executable instructions further configure the computer to enter a respective one of the sets of obligated payments to the electronic fund transfer payment processing module.

6. The computer-readable medium of claim 1, wherein one of the payment method processing modules is a credit payment processing module configured to process payments by credit, and wherein the computer-executable instructions further configure the computer to enter a respective one of the sets of obligated payments to the credit payment processing module.

7. The computer-readable medium of claim 1, wherein one of the payment method processing modules is a cash payment processing module configured to process payments by cash, and wherein the computer-executable instructions further configure the computer to enter a respective one of the sets of obligated payments to the cash payment processing module.

8. The computer-readable medium of claim 1, wherein the computer-executable instructions further configure the computer to identify and combine two or more of the obligated payments being assigned to the same user-selectable payment options for payment method, source account, currency, and payee.

9. The computer-readable medium of claim 1, wherein the computer-executable instructions further configure the computer to request approval for one or more of the obligated payments.

10. The computer-readable medium of claim 1, wherein the computer-executable instructions further configure the computer to reportably track data on the executing of the payment method processing modules and on each of the sets of prepared payments, and to store the data in a database.

11. The computer-readable medium of claim 1, wherein the computer-executable instructions are implemented in a Component Object Model (COM) software environment.

12. The computer-readable medium of claim 1, wherein the computer-executable instructions further configure the computer to receive a set of payroll payments among the obligated payments, to group the payroll payments into subsets including a set of payroll payments to be made by check and a set of payroll payments to be made by direct deposit, and to enter the set of payroll payments to be made by check to a check processing module and enter the set of payroll payments to be made by direct deposit to a direct deposit processing module.

13. The computer-readable medium of claim 1, wherein the computer-executable instructions further configure the computer to evaluate whether there are any obligated payments without corresponding prepared payments or any prepared payments without corresponding obligated payments, and to provide a user alert if either an obligated payment is detected that does not have a corresponding prepared payment or a prepared payment is detected that does not have a corresponding obligated payment.

14. The computer-readable medium of claim 1, wherein the computer-executable instructions further configure the computer to track the execution of the various payment method processing modules, including by monitoring external resources involved in the payment method processing modules.

15. A method of processing payments, comprising the steps of:
providing a computer-executed payment processing system configured to be controlled and tracked through a single, centralized user interface;
providing a first user option to open a payment processing session, and open a payment processing session in response to a user selecting the first user option;
providing user-selectable options through the user interface enabling a user to designate a batch of obligated payments from a plurality of sources representing a plurality of different types of obligated payments;
providing user-selectable options through the user interface for the batch of obligated payments to include specified types of obligated payments, wherein the user-selectable options for the specified types of obligated payments comprise: payroll payments, payments to suppliers in exchange for goods supplied, payments to service providers in exchange for services performed, refund payments to customers, and loan payments to banks and other creditors;
providing user-selectable options through the user interface enabling a user to group sets of the obligated payments to be paid with specified user-selectable payment options, wherein the user-selectable payment options for the sets of the obligated payments comprise: payment methods, source accounts from which the payments are to be made, currencies in which the payments are to be made, and payees to whom the payments are to be made, and wherein the options for payment methods include checks and electronic fund transfer;
entering each of the sets of obligated payments to a payment method processing module, configured to process payments using the user-selectable types of obligated payments and payment options selected for the respective set of obligated payments; and
executing the payment method processing modules, thereby generating a plurality of sets of prepared payments corresponding to the respective payment options selected for each of the sets of obligated payments.

16. The method of claim 15, wherein one of the first and second sets of obligated payments is to be paid by check, and a respective one of the first and second payment method processing modules is a check payment processing module configured to process payments by check; and the method comprises entering the set of obligated payments to be paid by check to the check payment processing module and executing the check payment processing module, thereby generating a first set of prepared checks corresponding to the set of obligated payments to be paid by check.

17. A system of modules configured for processing payments, comprising modules that, when executed, are configured to:
run a payment processing application that interactively provides user output and receives user input through a single, centralized user interface, enabling the payment processing application to be controlled and tracked through the user interface;
provide a first user option to open a payment processing session, and open a payment processing session in response to a user selecting the first user option;
provide user-selectable options through the user interface enabling a user to designate a batch of obligated payments from a plurality of data sources representing a plurality of different types of obligated payments;
provide user-selectable options through the user interface for the batch of obligated payments to include specified types of obligated payments, wherein the user-selectable options for the specified types of obligated payments comprise: payroll payments, payments to suppliers in exchange for goods supplied, payments to service providers in exchange for services performed, refund payments to customers, and loan payments to banks and other creditors;
provide user-selectable options through the user interface enabling a user to group each of the obligated payments to be paid with specified user-selectable payment options, wherein the user-selectable payment options for the sets of the obligated payments comprise: payment methods, source accounts from which the payments are to be made, currencies in which the payments are to be made, and payees to whom the payments are to be made, and wherein the options for payment methods include checks and electronic fund transfer;
transfer each of the payment sets to a payment method processing module configured to process payments using the user-selectable types of obligated payments and payment options selected for the respective set of obligated payments; and
execute the payment method processing modules, thereby generating a plurality of sets of prepared payments corresponding to the respective payment options selected for each of the sets of obligated payments.

18. The system of modules of claim 17, wherein some of the obligated payments are to be paid by check, and one of the first and second payment method processing modules is a check payment processing module configured to process payments by check, and the modules are configured to transfer the obligated payments to be paid by cheek to the check payment processing module.

* * * * *

UNITED STATES PATENT AND TRADEMARK OFFICE
CERTIFICATE OF CORRECTION

PATENT NO. : 7,523,068 B2  
APPLICATION NO. : 11/129082  
DATED : April 21, 2009  
INVENTOR(S) : Samantha A. Britney et al.

Page 1 of 1

It is certified that error appears in the above-identified patent and that said Letters Patent is hereby corrected as shown below:

In column 16, line 59, in Claim 18, delete "cheek" and insert -- check --, therefor.

Signed and Sealed this
Tenth Day of May, 2011

David J. Kappos
*Director of the United States Patent and Trademark Office*